Figure 1:
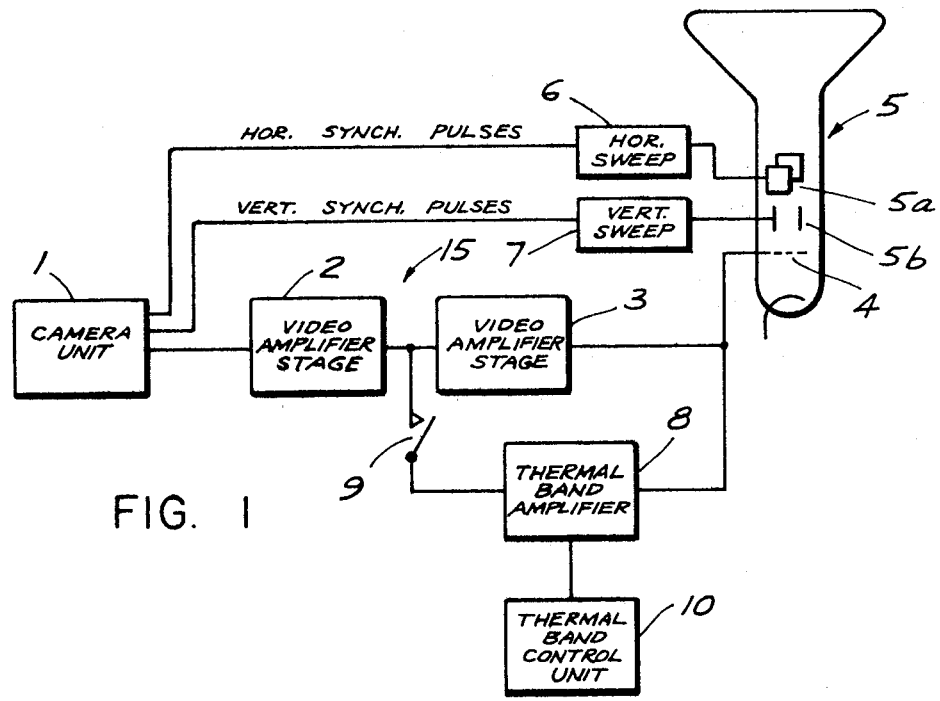

United States Patent

[11] 3,583,223

| [72] | Inventor | Tore Bertil Reinhold Olsson<br>Karlskoga, Sweden |
|---|---|---|
| [21] | Appl. No. | 761,632 |
| [22] | Filed | Sept. 23, 1968 |
| [45] | Patented | June 8, 1971 |
| [73] | Assignee | Aktiebolaget Bofors<br>Bofors, Sweden |
| [32] | Priority | Sept. 26, 1967 |
| [33] | | Sweden |
| [31] | | 13239/67 |

[54] INFRARED TELEVISION SYSTEM FOR TEMPERATURE MEASUREMENT
4 Claims, 2 Drawing Figs.

[52] U.S. Cl. .................................................. 73/355,
250/83.3, 315/30
[51] Int. Cl. ................................................... G01j 5/32,
H01j 31/49
[50] Field of Search ......................................... 73/355;
250/83.3 IRI; 315/30

[56] References Cited
UNITED STATES PATENTS

| 2,234,328 | 3/1941 | Wolff | 73/355-X |
| 2,295,059 | 9/1942 | Smyth | 315/30 |
| 2,371,897 | 3/1945 | Knick | 315/30 |
| 3,430,045 | 2/1969 | Bjork | 73/355-X |

OTHER REFERENCES

Astheimer, Robert W. " Temperature Measurement by Infrared Thermal Images." Chapter 86 in Temperature Its Measurement and Control in Science and Industry, Vol. 3, part 2, pp. 934— 6 relied on. N.Y., Reinhold, 1962. QC 271 A6 C2

*Primary Examiner*—Louis R. Prince
*Assistant Examiner*—Frederick Shoon
*Attorney*—Hane & Baxley ABSTRACT: An infrared television system for measuring temperature which has a brightness control circuit including two potentiometers connected in parallel with a direct voltage source and having their movable contacts connected to a summation circuit for producing a voltage equal to the sum of the voltages derived from the movable contacts, the control knob of one potentiometer being combined with a scale graduated in degrees in both the positive and negative directions from a zero point.

INVENTOR.
TORE BERTIL REINHOLD OLSSON
BY Hanne and Baxley
ATTORNEYS

INFRARED TELEVISION SYSTEM FOR TEMPERATURE MEASUREMENT

BACKGROUND OF THE INVENTION

The invention relates to an improvement in thermography equipment of the kind comprising an infrared camera and a display unit including a cathode-ray tube on the screen of which is produced a picture made of lighter and darker areas corresponding to areas of higher and lower surface temperatures of an object placed in the field of view of the camera. More particularly, the invention relates to a device for determining the temperature difference between points on an object so depicted.

It is known to provide the video amplifier between the infrared camera and the picture tube with control means for adjusting the brightness of the picture. It is also known to provide the thermography equipment with means for producing a so-called thermal band. Such means include a separate amplifier with control means for causing signals of a level corresponding to a certain temperature to be amplified to a higher degree than signals of levels corresponding to other temperatures, so that those points on the depicted object which have certain temperature are reproduced on the picture with a considerably greater light intensity than points having other temperatures. The control means comprise a manually operable setting device, by means of which the light intensity or the signal level which corresponds to a certain temperature can be set to a desired value within wide limits. The setting device consists of a potentiometer by means of which a voltage actuating the amplifier can be changed.

By means of this setting device it is possible to determine the temperature difference between different points on the depicted object. The setting device is provided with a control member, e.g. a knob, with a graduated scale from which the setting can be read. When determining the temperature difference between two points the control member is first set so that one point appears with a certain brightness on the picture, and the setting of the control member is noted. Then the setting is changed so that the second point appears on the picture with the same brightness as previously the first point, and the new setting is noted. The difference between the two settings is a measure of the temperature difference between the two points.

The infrared camera can discern temperature differences as small as 0.1° C., and it is desirable that such small temperature differences shall be determinable in the manner described above. On the other hand the temperature difference between two points on the same object may be much larger, and the difference in the average temperature between different objects can be still larger. It is desirable that even the least temperature difference which the camera can discern shall be measurable in the manner described. Thus, the least temperature difference should be represented by a distinct difference between the settings of the control member. On the other hand the control member should cover a temperature range which is larger by several powers of 10 than the said least temperature difference. This entails difficulties in the design of the control member. Also, a measurement in the described manner requires that a calculation be carried out, namely a subtraction of one setting value from another one.

It is an object of the present invention to eliminate the said difficulties and to make possible a direct reading of the temperature difference.

SUMMARY OF THE INVENTION

According to the invention the setting device comprises two potentiometers for adjusting the voltage which controls the light intensity, and these potentiometers are so arranged that the said voltage is dependent on the settings of both potentiometers, and on potentiometer is provided with a control member combined with a scale having a zero point for reading the position of the control member.

Preferably, the scale is graduated from the zero point in the positive as well as in the negative sense, and the control member is so arranged that its setting on the zero point corresponds to a setting of the movable contact of the potentiometer about midway between the extreme positions. The scale may be graduated in temperature degrees.

DRAWING AND DETAILED DESCRIPTION

The invention is illustrated schematically on the accompanying drawing.

Figure 2:
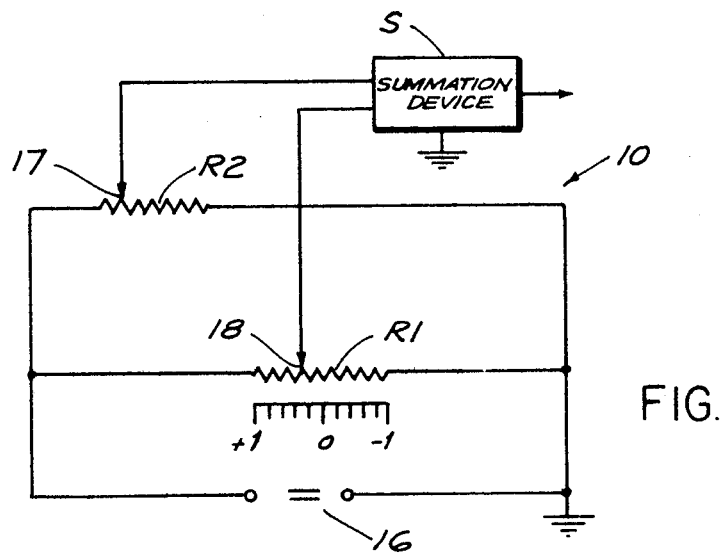

FIG. 1 is a block diagram of a thermography equipment embodying the invention; and FIG. 2 is a circuit diagram illustrating the invention.

The thermography equipment shown in FIG. 1 includes a camera unit 1 which includes in a conventional manner a scanning system, a focusing means and a detector sensitive to infrared radiation and producing a video signal varying in intensity according to the temperature of scanned points on an object placed in the field of view of the camera. The camera unit may also contain a preamplifier for amplifying the video signals.

The video signals produced by the camera unit 1 are applied to a video amplifier 15 comprising two stages 2 and 3. The output signal from the final stage 3 is applied to an intensity control electrode 4 of a cathode-ray tube 5. The cathode-ray tube 5 is provided with deflecting means 5a and 5b for deflecting the beam respectively in horizontal and vertical direction under the control of sweep voltages from sweep generators 6 and 7, which are synchronized by synchronizing pulses from the scanning system of the camera unit 1, so that the electron beam in tube 5 is caused to sweep across the face of the tube in a pattern corresponding to the scanning pattern of the camera.

The shown thermography equipment also includes a separate amplifier 8 for producing a thermal band. The input of the thermal band amplifier 8 is connectable to the main video amplifier 15 at a point between stages 2 and 3 by means of a switch 9. When switch 9 is closed as shown part of the signal energy is branched off from the main video amplifier and passed to the input of the thermal band amplifier 8. This amplifier is so designed that it produces an output signal only when the input signal exceeds a certain minimum and but is below a certain maximum level. When this is the case, the thermal band amplifier produces an output signal in the form of pulses of constant amplitude which are applied to the intensity control electrode 4 of cathode-ray tube 5. The amplitude of this output signal is so large that it produces an intensity which is much higher than that produced by the signals passed by the video amplifier 15. Since the output signals from the thermal band amplifier 8 represent a certain temperature range, the limits of which correspond to said minimum and maximum signal levels, those areas on the depicted object which have a temperature falling within this range will appear on the cathode-ray tube screen with a much higher brightness than areas having temperatures falling outside this range. This range can be made very narrow so that it may be considered to represent a single temperature value within a fraction of 1 centigrade.

The term "thermal band" as used in this description refers to said temperature range and the corresponding signal level range as well as to those areas on the picture screen of the cathode-ray tube 5 which present said higher brightness as caused by the output signals from the thermal band amplifier 8.

The thermal band amplifier 8 is associated with manually operated control means for varying the mean level of the thermal band. Such control means as well as the thermal band amplifier as a whole are well known in the art and will therefore not be described in detail. The variation is effected by varying a control voltage which determines the mean level of the thermal band. Thus, if this control voltage is changed the thermal band areas on the picture screen of the cathode-ray tube 5 will be moved. Obviously, the change of control voltage required to move the thermal band from one point or area on the picture screen to a second point or area is dependent on the temperature difference between the corresponding points or areas on the depicted object, whereby the temperature difference between said points or areas can be determined.

In FIG. 1, the means for producing and varying said control voltage is schematically symbolized by the block 10. FIG. 2 shows in detail how this control means is embodied according to the present invention. Two potentiometers R1 and R2 are connected in parallel to each other by their fixed terminals and to a direct voltage source 16. The movable contacts 17 and 18 of potentiometers R1 and R2 respectively, are connected to a summation device S of known type which delivers an output voltage equal to the sum of the voltages derived from the potentiometers. This output voltage is applied to the thermal band amplifier 8 (FIG. 1).

The potentiometers R1 and R2 are manipulated by means of knobs which are preferably mounted on the front panel of the oscilloscope so that they can be conveniently manipulated at the same time as the picture on the screen of the picture tube is viewed. As indicated on the figure the knob of the potentiometer R1 is graduated in a positive as well as in a negative sense from a zero point which corresponds to a setting of a movable contact of the potentiometer midway between the extreme positions. The graduation can directly indicate temperature degrees and fractions thereof.

For the measurement of the temperature difference between two points in the picture area the device is used in the following manner.

The potentiometer R1 is first set to zero by correspondingly setting its movable contact 18. While this position of potentiometer R1 is maintained, potentiometer R2 is set so that the thermal band will appear at one of said points. The potentiometer R2 is maintained in the set position, and the potentiometer R1 is now set by means of its contact 17 until the thermal band has been moved to the second point. The temperature difference between the two points can now be directly read on the scale associated with potentiometer R1 if suitably calibrated.

However, the device according to the invention can also be used when the thermography equipment is not provided with the thermal band facility but only with a simple brightness control means operable by varying a control voltage. In such case, the output of the summation device S is connected to said brightness control means. For measuring the temperature difference between two points, the potentiometer R1 is first set to zero and potentiometer R2 is then set so that one of the points becomes just visible. Then the knob of potentiometer R1 is turned until the second point becomes just visible, and the temperature difference is read on the scale of potentiometer R1.

I claim:

1. An improvement in thermography equipment of the kind producing on the picture screen of a cathode-ray tube a picture made up of lighter and darker areas corresponding to areas of higher and lower surface temperatures of a depicted object, said equipment comprising a camera having scanning means and detecting means sensitive to infrared radiation for producing video signals varying in intensity according to the temperature of scanned points on an object placed in the field of view of the camera, a video amplifier for amplifying said video signals, intensity control means for controlling the intensity of the electron beam in said cathode-ray tube, means for applying the amplified video signals to said intensity control means, means for causing said beam to sweep across the picture screen of the cathode-ray tube in a pattern corresponding to the scanning pattern of said scanning means of the camera, and manually operable control means connected to said intensity control means for varying a voltage controlling the brightness of the picture on the picture screen of the cathode-ray tube, wherein said improvement resides in said manually operable control means including:

a voltage source;
a first manually adjustable potentiometer and a second manually adjustable potentiometer connected in circuit to generate said brightness control voltage so that said control voltage is dependent on the settings of both potentiometers, said first potentiometer comprising a setting member coacting with a graduated scale for reading the position of the setting member, whereby the temperature difference between any two points on the depicted object is measurable by first setting said first potentiometer to a zero point on said scale, then setting the second potentiometer so as to cause a first point on the picture to assume a predetermined brightness, then again setting the first potentiometer to cause a second point on the picture to assume said predetermined brightness and reading said scale.

2. A control means as claimed 1, in which said scale of the first potentiometer is graduated for setting to extreme positions in positive and negative sense with reference to a zero point, and the setting of said setting member to the zero point corresponds to a position of a movable contact of said first potentiometer about halfway between the extreme positions.

3. A control means as claimed in claim 1, in which said scale is graduated in temperature degrees.

4. A control means as claimed in claim 1 in which said first and second potentiometers are connected in parallel with each other and to a direct voltage source, the setting members of the potentiometers comprising movable contacts, and wherein a summation device is connected to the potentiometers for adding the derived voltages.